United States Patent
Hedesiu et al.

(10) Patent No.: US 10,961,376 B2
(45) Date of Patent: *Mar. 30, 2021

(54) PROPYLENE RANDOM COPOLYMER COMPOSITION FOR PIPE APPLICATIONS

(71) Applicants: ABU DHABI POLYMERS CO. LTD (BOROUGE) L.L.C., Abu Dhabi (AE); BOREALIS AG, Vienna (AT)

(72) Inventors: Cristian Hedesiu, Abu Dhabi (AE); Kauno Alastalo, Porvoo (FI)

(73) Assignees: ABU DHABI POLYMERS CO. LTD (BOROUGE) L.L.C., Abu Dhabi (AE); Borealis AG, Vienna (AT)

( * ) Notice: Subject to any disclaimer, the term of this patent is extended or adjusted under 35 U.S.C. 154(b) by 1125 days.

This patent is subject to a terminal disclaimer.

(21) Appl. No.: 14/786,482

(22) PCT Filed: Apr. 22, 2014

(86) PCT No.: PCT/EP2014/001073
§ 371 (c)(1),
(2) Date: Jan. 12, 2016

(87) PCT Pub. No.: WO2014/173534
PCT Pub. Date: Oct. 30, 2014

(65) Prior Publication Data
US 2016/0145428 A1     May 26, 2016

(30) Foreign Application Priority Data

Apr. 22, 2013   (EP) .................................. 13002103

(51) Int. Cl.
| | | |
|---|---|---|
| *C08L 23/14* | (2006.01) | |
| *F16L 9/12* | (2006.01) | |
| *C08K 5/00* | (2006.01) | |

(52) U.S. Cl.
CPC .............. *C08L 23/14* (2013.01); *C08L 23/142* (2013.01); *F16L 9/12* (2013.01); *C08K 5/0083* (2013.01); *C08L 2203/18* (2013.01); *C08L 2205/02* (2013.01); *C08L 2205/025* (2013.01); *C08L 2205/24* (2013.01); *C08L 2314/02* (2013.01)

(58) Field of Classification Search
CPC .... C08L 23/14; C08L 23/142; C08L 2314/02; C08L 2203/18; C08L 2205/24; C08L 2205/025; C08L 2205/02; F16L 9/12; C08K 5/0083
USPC ............... 428/212, 36.92, 426, 447; 285/403
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,473,660 A | 9/1984 | Albizzati et al. |
| 4,530,912 A | 7/1985 | Pullukat et al. |
| 4,560,671 A | 12/1985 | Gross et al. |
| 4,582,816 A | 4/1986 | Miro |
| 5,391,654 A | 2/1995 | Ahvenainen |

FOREIGN PATENT DOCUMENTS

| | | |
|---|---|---|
| EP | 0479186 A2 | 4/1992 |
| EP | 0491566 | 12/1992 |
| EP | 0586390 | 5/1997 |
| EP | 0591224 | 2/1998 |
| EP | 887380 A1 | 12/1998 |
| EP | 1028984 B1 | 7/2001 |
| EP | 1724289 A1 | 11/2006 |
| EP | 2014715 A1 | 1/2009 |
| EP | 2072546 A1 | 6/2009 |
| EP | 2562215 A1 | 2/2013 |
| GB | 1580635 | 12/1980 |
| WO | 87/07620 A1 | 12/1987 |
| WO | 92/19653 A1 | 11/1992 |
| WO | 92/19658 A1 | 11/1992 |
| WO | 92/19659 A1 | 11/1992 |
| WO | 92/21705 A1 | 12/1992 |
| WO | 93/11165 A1 | 6/1993 |
| WO | 93/11166 A1 | 6/1993 |
| WO | 93/19100 A1 | 9/1993 |
| WO | 97/36939 A1 | 10/1997 |
| WO | 98/12234 A1 | 3/1998 |

(Continued)

OTHER PUBLICATIONS

International Preliminary Report on Patentability of PCT/EP2014/001073 dated Oct. 27, 2015.
Heino et al., "Rheological Characterization of Polyethylene Fractions", Theoretical and Applied Rheology, 11th (1992), vol. 1, pp. 360-362.
Heino, "The Influence of Molecular Structure on Some Rheological Properties of Polyethylene", Annual Transactions of the Nordic Rheology Society, 1995, pp. 71-73.
Kay et al., "Definition of Terms Relating to the Non-Ultimate Mechanical Properties of Polymers", Pure & Appl. Chem., vol. 70, No. 3, pp. 701-754, 1998.

(Continued)

*Primary Examiner* — Gerard Higgins
*Assistant Examiner* — Kevin C Ortman, Jr.
(74) *Attorney, Agent, or Firm* — Ditthavong, Steiner & Mlotkowski

(57) ABSTRACT

The present invention relates to a polypropylene composition comprising
a multimodal propylene random copolymer (A) with at least one comonomer selected from alpha-olefins with 2 or 4 to 8 carbon atoms and
a nucleating agent (B),
wherein the polypropylene composition has a Charpy Notched Impact Strength at 23° C. of at least 30 kJ/m$^2$, determined according to ISO 179/1eA:2000 using notched injection moulded specimens, a process for producing said polypropylene composition, an article comprising said polypropylene composition and the use of said polypropylene composition for the production of an article.

18 Claims, No Drawings

(56) References Cited

FOREIGN PATENT DOCUMENTS

| WO | 98/58975 A1 | 12/1998 |
| WO | 98/58976 A1 | 12/1998 |
| WO | 98/58977 A1 | 12/1998 |
| WO | 99/24479 A1 | 5/1999 |
| WO | 9924478 A1 | 5/1999 |
| WO | 99/33842 A1 | 7/1999 |
| WO | 00/68315 A1 | 11/2000 |

OTHER PUBLICATIONS

International Search Report and Written Opinion of PCT/EP2014/001073 dated Jul. 14, 2014.
International Search Report and Written Opinion issued in Application No. PCT/EP2014/001073 dated Jul. 14, 2014, 8 pages.

PROPYLENE RANDOM COPOLYMER COMPOSITION FOR PIPE APPLICATIONS

The present invention relates to nucleated propylene random copolymer compositions with an improved balance of properties in regard of mechanical properties including impact properties and processing properties which are suitable for pipe applications.

Polypropylene materials are frequently used for various pipe and pipe fitting applications, such as fluid transport, e.g. water or natural gas, during which the fluid is pressurized and/or heated. In particular, polypropylene materials are used in applications for plumbing and heating, such as in-house hot and cold water pressure pipes and fittings, floor and wall heating systems and radiator connections.

Thereby, propylene random copolymers are especially suitable for pressure pipe applications for hot water and industrial pipes as the random copolymers have inter alia good impact performance, stiffness, creep resistance and slow crack properties and long term pressure resistance.

The expression "pressure pipe" used herein refers to a pipe which, when used, is subjected to a positive pressure, that is the pressure inside the pipe being higher than the pressure outside the pipe.

It is well known that increasing one of the impact or stiffness properties sacrifices the other.

Moreover, propylene random copolymers based pipes for hot and cold water pressure applications are often coloured e.g. Green, Grey, Blue, and White etc. Different pigments have different nucleation effect on propylene random copolymers and variation in intensity of the effect from one colour to another will result in dimensional variations because differences in shrinkage associated with the nucleation.

Naturally, processability like extrusion output rate during pipe production and shorter cycle time during injection moulding of fittings should be industrially feasible, as well as the surface quality of the final pipe and/or fitting.

As to alpha nucleated polypropylene pipes, WO0068315 (EP1183307) of Borealis discloses nucleated homo polymer and heterophasic copolymer of propylene and mentions pipe as one of the numerous options of end applications. Said solution is focused on moulding applications and the examples are for homo polypropylene and heterophasic polypropylene with high melt flow rate which is not suitable for pipe applications.

WO 99/24479 of Borealis discloses nucleated propylene polymer, however examples disclose homo polymers of propylene and heterophasic copolymers of propylene. The heterophasic copolymers of propylene are stated to be "stiff" (examples 9 and 10, e.g. flexural modulus of around 1500 and 1600 MPa), whereby they are suitable for sewage pipe applications.

The present invention relates to a polypropylene composition suitable for pipe applications comprising
a multimodal propylene random copolymer (A) with at least one comonomer selected from alpha-olefins with 2 or 4 to 8 carbon atoms and
a nucleating agent (B),
wherein the polypropylene composition has a Charpy Notched Impact Strength at 23° C. of at least 30 kJ/m$^2$, determined according to ISO 179/1eA:2000 using notched injection moulded specimens.

The present invention is further characterized in that the multimodal propylene random copolymer (A) of the polypropylene composition of the invention does not contain an elastomeric phase dispersed therein.

It has surprisingly been found that the polypropylene composition according to the present invention not only shows good mechanical properties in view of the flexural modulus, but also very good impact properties, as can be seen from the Charpy Notched Impact Strength at room temperature and preferably also at cold temperatures. More preferably the present multimodal polypropylene composition shows advantageously feasible creep resistance as can be seen from tensile stress. Further preferably, the present multimodal polypropylene composition has advantageous pressure resistance required for pressure pipe applications. The present multimodal polypropylene composition has preferably also an advantageous processing behavior in terms of pipe extrusion and/or cycle time of molded fittings. The obtained final pipe or fitting has a uniform shrinkage behavior and a good surface quality.

Pressure pipe for hot and cold water applications has a well-known meaning in the field of polypropylene pipe applications and implies for a skilled person generally accepted property requirements for the pipe to be usable in such applications.

A propylene random copolymer denotes a copolymer of propylene monomer units and comonomer units in which the comonomer units are randomly distributed in the polymeric chain. Thereby, a propylene random copolymer includes a fraction, which is insoluble in xylene-xylene cold insoluble (XCU) fraction, in an amount of at least 70 wt %, more preferably of at least 80 wt %, still more preferably of at least 85 wt % and most preferably of at least 90 wt %, based on the total amount of the propylene random copolymer.

Accordingly, the random copolymer does not contain an elastomeric polymer phase dispersed therein.

As known for skilled person, random copolymer is different from heterophasic polypropylene which is a propylene copolymer comprising a propylene homo or random copolymer matrix component (1) and an elastomeric copolymer component (2) of propylene with one or more of ethylene and C4-C8 alpha-olefin copolymers, wherein the elastomeric (amorphous) copolymer component (2) is dispersed in said propylene homo or random copolymer matrix polymer (1).

Usually, a propylene polymer comprising at least two propylene polymer fractions (components), which have been produced under different polymerisation conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal polypropylene, a propylene polymer consisting of two fractions only is called "bimodal", whereas a propylene polymer consisting of three fractions only is called "trimodal".

Thereby the term "different" means that the propylene polymer fractions differ from each other in at least one property, preferably in the weight average molecular weight or comonomer content or both, more preferably at least in the weight average molecular weight.

The form of the molecular weight distribution curve, i.e. the appearance of the graph of the polymer weight fraction as function of its molecular weight, of such a multimodal propylene polymer is at least distinctly broadened in comparison with the curves for the individual fractions.

The propylene random copolymer used in the present invention is a multimodal propylene random copolymer, more preferably a bimodal propylene random copolymer.

Preferably, the multimodal propylene random copolymer (A) consists of the two propylene copolymer fractions with the proviso that at least one of the two fractions, preferably both fractions are propylene random copolymer fractions.

A propylene homopolymer thereby denotes a polymer consisting essentially of propylene monomer units. Due to the requirements of large-scale polymerization it may be possible that the propylene homopolymer includes minor amounts of comonomer units, which usually is below 0.1 mol %, preferably below 0.05 mol %, most preferably below 0.01 mol % of the propylene homopolymer.

A nucleating agent denotes herein a compound or composition which is added on purpose to increase the crystallization rate within the solid polymer and lead to an increased degree of crystallinity (and often to a smaller crystal size) of the solid polymer.

The multimodal propylene random copolymer (A) used in the polypropylene composition of the invention comprises at least one comonomer selected from alpha-olefins with 2 or 4 to 8 carbon atoms.

The multimodal propylene random copolymer (A) may comprise only one type of comonomers or two or more types of comonomers.

The comonomers of said multimodal propylene random copolymer (A) are preferably selected from $C_2$ and $C_4$ to $C_6$ alpha-olefins. A particular preferred comonomer is ethylene.

Especially suitable for the polypropylene composition of the present invention is a multimodal propylene random copolymer (A) which is a propylene random copolymer with ethylene comonomer.

It is preferred that the propylene random copolymer (A), which is preferably the propylene random copolymer with ethylene comonomer, comprises at least a propylene random copolymer having a low molecular weight (low molecular weight (LMW) fraction) and a propylene random copolymer having a high molecular weight (high molecular weight (HMW) fraction). Thereby, the LMW fraction has a lower weight average molecular weight than the HMW fraction.

It is well known that melt flow rate (MFR) of a polymer is an indication of the weight average molecular weight (Mw) of the polymer, the higher the MFR the lower the Mw of the polymer and, respectively, the lower the MFR the higher the Mw of the polymer. Accordingly, the MFR of the low molecular weight fraction is higher than the MFR of the high molecular weight fraction.

Preferably both the low molecular weight fraction and the high molecular weight fraction are propylene random copolymer fractions which may have essentially the same or different comonomer content. It is thereby preferred that the high molecular weight fraction has an equal to higher, preferably higher, comonomer content compared to the low molecular weight fraction.

The comonomer content of the high molecular weight fraction is usually in the range of 1.0 to 17.0 mol %, preferably 1.5 to 10.0 mol %, more preferably 3.5 to 8.5 mol %, still more preferably 5.0 to 8.0 mol, most preferably 6.0 to 7.5 mol %, based on the total content of monomeric units in the high molecular weight fraction.

The comonomer content of the low molecular weight fraction is usually in the range of 0.1 to 11.0 mol %, preferably 1.5 to 8.5 wt %, more preferably 3.5 to 7.5 mol %, most preferably 5.0 to 6.5 mol %, based on the total content of monomeric units in the low molecular weight fraction.

In a preferred embodiment of the invention, the multimodal propylene random copolymer (A) comprises at least a low molecular weight fraction (LMW fraction) and a high molecular weight fraction (HMW fraction), wherein the high molecular weight fraction (HMW fraction) has higher comonomer, preferably ethylene comonomer, content, than the low molecular weight fraction (LMW fraction). In this preferred embodiment the comonomer, preferably ethylene comonomer content of HMW fraction, is within the preferred ranges as defined above.

The comonomer content of the multimodal propylene random copolymer (A) is usually in the range of 0.1 to 14 mol %, preferably 1.5 to 10.0 mol %, more preferably 3.5 to 8.5 mol %, still more preferably 4.0 to 7.0 mol %, most preferably 4.5 to 6.5 mol %, based on the total content of monomeric units in the multimodal propylene random copolymer (A).

The low molecular weight fraction and the high molecular weight fraction may include the same type of comonomer or different types of comonomers. It is thereby preferred that both fractions include the same type of comonomer.

The low molecular weight fraction is preferably present in the propylene random copolymer in an amount of 35 to 55 wt %, more preferably in an amount of 40 to 50 wt % and most preferably in an amount of 40 to 47 wt %, based on the total amount of the propylene random copolymer (100 wt %), preferably, and the high molecular weight fraction is preferably present in the propylene random copolymer in an amount of 65 to 45 wt %, more preferably in an amount of 60 to 50 wt % and most preferably in an amount of 60 to 53 wt %, based on the total amount of the propylene random copolymer (100 wt %).

The multimodal propylene random copolymer (A) preferably has a density of 890 to 910, preferably 895 to 905 $kg/m^3$.

It is preferred that the propylene random copolymer (A) consists of the propylene random copolymer having a low molecular weight (low molecular weight (LMW) fraction), the propylene random copolymer having a high molecular weight (high molecular weight (HMW) fraction), the nucleating agent (B) and optional further additives, as defined above or below.

The multimodal propylene random copolymer (A) may further comprise a prepolymer fraction. In case of the presence of a prepolymer fraction, said fraction is calculated to the amount (wt %) of the low molecular weight fraction or high molecular weight fraction, preferably to the amount of high molecular weight fraction. The prepolymer fraction can be propylene homopolymer or copolymer.

It is especially preferred that polypropylene composition according to the invention consists of the propylene random copolymer (A), the nucleating agent (B) and optional further additives, as defined above or below.

Accordingly, the amount of the multimodal propylene random copolymer (A) is preferably 90.0 to 99.75 wt %, more preferably of 95.0 to 99.75 wt % and even more preferably of 96.5 to 99.75 wt %, based on the total weight of the polypropylene composition (100 wt %).

The nucleating agent (B) used in the polypropylene composition of the invention is preferably selected from
polymeric nucleating agents,
salts of monocarboxylic acids and polycarboxylic acids, for example sodium benzoate;
Sorbitol compounds, for instance diacetals of sorbitol or xylitol, for example 1,3:2,4 Bis(3,4-dimethylbenzylidene) sorbitol (CAS-no. 135861-56-2, e.g. Millad 3988, supplier Milliken);

nonitol based nucleating agents, for instance 1,2,3-trideoxy-4,6:5,7-bis-O-((4-propylphenyl) methylene) nonitol (CAS-no. 882073-43-0, e.g. Millad NX8000, supplier Milliken):

Phosphorous-based compounds, for instance mono-, bis- or tetra-phenyl phosphates, for example Sodium 2,2'-methylene bis-(4,6-di-tert. butylphenyl) phosphate (CAS-no. 85209-91-2, e.g. NA-11, supplier Adeka Corporation) or Hydroxybis (2,4,8,10-tetra-tert. butyl-6-hydroxy-12H-dibenzo(d,g)(1,3,2) dioxaphosphocin 6-oxidato) aluminium (CAS-no. 151841-65-5, e.g. ADK STAB NA-21, supplier Adeka Corporation), or talc, or any mixtures thereof.

More preferably, the nucleating agent (B) is other than beta-nucleating agent, which term is well known in the art.

It is preferred that said nucleating agent (B) is a polymeric nucleating agent, preferably a polymer of vinyl compound, more preferably a polymeric nucleating agent obtainable by polymerising vinylcycloalkane monomers or vinylalkane monomers.

The polymeric nucleating agent is more preferably a polymerized vinyl compound according to the following formula

$$CH_2=CH-CHR^1R^2 \quad (I)$$

wherein $R^1$ and $R^2$ together form a 5- or 6-membered saturated, unsaturated or aromatic ring, optionally containing substituents, or independently represent an alkyl group comprising 1 to 4 carbon atoms, whereby in case $R^1$ and $R^2$ form an aromatic ring, the hydrogen atom of the —$CHR^1R^2$ moiety is not present.

Even more preferably, nucleating agent (B) is selected from: vinyl cycloalkane polymer, preferably vinyl cyclohexane (VCH) polymer, vinyl cyclopentane polymer, 3-methyl-1-butene polymer and vinyl-2-methyl cyclohexane polymer. The most preferred nucleating agent (B) is vinyl cyclohexane (VCH) polymer.

As mentioned above, in a preferred embodiment, nucleating agent (B) is a polymeric nucleating agent, more preferably a polymer of vinyl compound according to formula (I) as defined above, even more preferably vinyl cyclohexane (VCH) polymer.

The amount of nucleating agent (B) preferably is not more than 10000 ppm by weight (means parts per million based on the total weight of the polypropylene composition (100 wt %), preferably based on the combined weight of propylene random copolymer (A) and nucleating agent (B), also abbreviated herein shortly as ppm), more preferably not more than 6000 ppm, even more preferably not more than 5000 ppm, based on the total weight of the polypropylene composition (100 wt %), preferably based on the combined weight of propylene random copolymer (A) and nucleating agent (B).

The amount of the nucleating agent (B) still more preferably is not more than 500 ppm, preferably is from 0.025 to 200 ppm, and more preferably is from 0.1 to 200 ppm, more preferably is from 0.3 to 200 ppm, most preferably is from 0.3 to 100 ppm, based on the total weight of the polypropylene composition (100 wt %), preferably based on the combined weight of propylene random copolymer (A) and nucleating agent (B).

In the preferred embodiment the nucleating agent (B) is a polymeric nucleating agent, most preferably a polymer of vinyl compound according to formula (I) as defined above, even more preferably vinyl cyclohexane (VCH) polymer as defined above, and the amount of said nucleating agent (B) is not more than 500 ppm, more preferably is from 0.025 to 200 ppm, and more preferably is from 0.1 to 200 ppm, more preferably is from 0.3 to 200 ppm, most preferably is from 0.3 to 100 ppm, based on the total weight of the polypropylene composition (100 wt %), preferably based on the combined weight of propylene random copolymer (A) and nucleating agent (B).

The nucleating agent (B) may be introduced to the multimodal propylene random copolymer (A) e.g. during the polymerisation process of the multimodal propylene random copolymer (A) or may be incorporated to the multimodal propylene random copolymer (A) in the form of masterbatch (MB) together with e.g. a carrier polymer. It is preferred that the nucleating agent (B) is introduced to the multimodal propylene random copolymer (A) during the polymerisation process of the multimodal propylene random copolymer (A). The nucleating agent (B) is preferably introduced to the multimodal propylene random copolymer (A) by first polymerising the above defined vinyl compound according to formula (I) as defined above, even more preferably vinyl cyclohexane (VCH), in the presence of a catalyst system comprising a solid catalyst component, preferably a solid Ziegler Natta catalyst component, a cocatalyst and optional external donor, and the obtained reaction mixture of the polymer of the vinyl compound according to formula (I) as defined above, even more preferably vinyl cyclohexane (VCH) polymer, and the catalyst system is then used for producing the multimodal propylene random copolymer (A).

Said obtained reaction mixture is herein below referred interchangeably as modified catalyst system.

Moreover, the propylene composition of the invention may contain further additives suitable for pipe applications, preferably conventional additives for pipe applications, in addition to the nucleating agent (B), including without limiting to, further nucleating agents, clarifiers, brighteners, acid scavengers and antioxidants, as well as slip agents, inorganic filler and UV light stabilizers. Each additive can be used e.g. in conventional amounts, the total amount of additives present in the propylene composition being preferably as defined below. Such additives are generally commercially available and are described, for example, in "Plastic Additives Handbook", 5th edition, 2001 of Hans Zweifel.

The total amount of optional further additives is preferably between 0.0001 and 10 wt %, preferably 0.0001 and 5.0 wt %, preferably 0.0001 and 2.5 wt %, more preferably between 0.0001 and 1.5 wt %, still more preferably between 0.0001 and 1.0 wt %, based on the total weight of the polypropylene composition (100 wt %). In case the nucleating agent (B) and/or any optional additive(s) is added in an optional masterbatch, then the carrier material, e.g. carrier polymer, of the additive is calculated to the (total) amount of the additive(s), based on the total weight of the polypropylene composition (100 wt %).

It is especially preferred that polypropylene composition according to the invention consists of the multimodal propylene random copolymer (A), the nucleating agent (B) and optional additives, all as defined above.

The polypropylene composition preferably has a melt flow rate $MFR_2$ (2.16 kg, 230° C.) of 0.1 to 1.0 g/10 min, more preferably 0.1 to 0.7 g/10 min, more preferably 0.15 to 0.5 g/10 min, more preferably 0.2 to 0.4 g/10 min, determined according to ISO 1133.

Further, the polypropylene composition preferably has a content of xylene cold solubles (XCS) of 1 to 15 wt %, more preferably of 2 to 12 wt %, most preferably of 4 to 10 wt %, determined at 25° C. according to ISO 16152. Still further, the polypropylene composition preferably has a crystallization temperature of 105° C. to 130° C., more preferably of 107° C. to 127° C., most preferably of 110° C. to 125° C., even most preferably of 110° C. to 120° C.

It is preferred that the polypropylene composition has a polydispersity index PI of from 2.0 to 6.0, preferably of from 2.5 to 5.5, more preferably of from 3.0 to 5.0 and most preferably of from 3.2 to 4.5. The polydispersity index is determined from rheological measurements as described below in the example section.

Preferably, the polypropylene composition has a Charpy Notched Impact Strength at room temperature (23° C.) of from 35 to 100 kJ/m$^3$, more preferably from 37 to 80 kJ/m$^3$, most preferably from 38 to 70 kJ/m$^3$.

Preferably also the Charpy Notched Impact Strength at cold temperatures (0° C., −20° C.) is very advantageous.

The polypropylene composition preferably has a flexural modulus of at least 700 MPa, more preferably at least 750 MPa, more preferably at least 800 MPa, more preferably at least 850 MPa, determined according to ISO 178 at a test speed of 2 mm/min and a force of 100N on test specimens having a dimension of 80×10×4.0 mm$^3$ (length×width× thickness) prepared by injection moulding according to EN ISO 1873-2. The upper limit of the flexural modulus usually does not exceed 1400 MPa, and is preferably 1200 MPa or less. The polypropylene Accordingly, the polypropylene composition preferably has a tensile stress at yield of at least 20 MPa, more preferably at least 25 MPa, most preferably at least 27 MPa, determined according to ISO 527-2:1996 using type 1A injection moulded test specimens prepared according to ISO 527-2:1996. The upper limit of the tensile stress at yield usually does not exceed 50 MPa and is preferably not higher than 45 MPa.

The shrinkage of the polypropylene composition after forming the composition into an article, preferably a pipe or a pipe fitting, is preferably not more than 6%, more preferably not more than 5%, most preferably not The polypropylene composition of the invention is preferably produced in a continuous multistage process in a conventional manner. It is to be understood that as soon as the inventors have found the advantageous property balance resulting to the polypropylene composition, then for industrial scale production it is within the skills of a skilled person to adjust process parameters and controls to obtain the properties of the polypropylene composition. The process preferably comprises at least two polymerisation stages.

Accordingly a process for producing a polypropylene composition as described above or below, wherein the propylene random copolymer is polymerized in a multistage polymerization process in the presence of
(I) a solid catalyst component comprising a magnesium halide, a titanium halide and an internal electron donor; and
(II) a cocatalyst comprising an aluminium alkyl and optionally an external electron donor, and
(III) an optional nucleating agent (B), preferably in the presence of a nucleating agent (B) as defined above or below;
the multistage process comprising the steps of
(a) continuously polymerizing propylene together with a comonomer selected from alpha-olefins with 2 or 4 to 8 carbon atoms, in a first polymerization stage by introducing streams of propylene, hydrogen and said comonomer into the first polymerization stage at a temperature of 60 to 80° C. and a pressure of 3000 to 6500 kPa to produce a first propylene random copolymer;
(b) withdrawing from the first polymerization stage a stream comprising said first propylene random copolymer and transferring said stream into a second polymerization stage;
(c) polymerizing propylene together with a comonomer selected from alpha-olefins with 2 or 4 to 8 carbon atoms, in said second polymerization stage by introducing streams of propylene, said comonomer and optionally hydrogen into said second polymerization stage at a temperature of 70 to 90° C. and a pressure of 1000 to 3000 kPa to produce a propylene random copolymer (A) of said first propylene random copolymer and a second propylene random copolymer;
(d) continuously withdrawing a stream comprising said propylene random copolymer (A) from the second polymerization stage and optionally mixing said propylene random copolymer (A) with additives; and
(e) extruding said propylene random copolymer mixture into pellets, which have a melt flow rate MFR$_2$ (2.16 kg; 230° C.; ISO 1133) of from 0.1 to 1.0 g/min,
and wherein the first propylene random copolymer has preferably a higher weight average molecular weight than the second propylene random copolymer.

It is especially preferred that the process according to the present invention includes the following process steps:
(aa) polymerising a vinyl compound of the formula (I) as defined above or below, preferably vinyl cyclohexane (VCH), in the presence of a catalyst system comprising the solid catalyst component (I) to obtain a modified catalyst system which is the reaction mixture comprising the solid catalyst component (I) and the produced polymer of the vinyl compound of formula (I), preferably, and wherein, the weight ratio (g) of the polymer of the vinyl compound of the formula (I) to the solid catalyst component (I) is up to 5 (5:1), preferably up to 3 (3:1) most preferably is from 0.5 (1:2) to 2 (2:1), and the obtained modified catalyst system is fed to polymerisation step (a) of the multistage process for producing the multimodal propylene copolymer (A).

The process of the invention is described in details below:
Accordingly, conventional polymerization techniques, e.g. gas phase, solution phase, slurry or bulk polymerization can be used.

In general, a combination of slurry (or bulk) and at least one gas phase reactor is often preferred for the polymerisation of the multimodal propylene random copolymer (A). It is further preferred that the reactor order is slurry (or bulk) then one or more gas phase reactors.

In case of propylene polymerisation for slurry reactors, the reaction temperature will generally be in the range 60 to 110° C., e.g. 60 to 85° C., the reactor pressure will generally be in the range 5 to 80 bar, e.g. 20 to 60 bar, and the residence time will generally be in the range 0.1 to 5 hours, e.g. 0.3 to 2 hours. The monomer is usually used as reaction medium.

For gas phase reactors, the reaction temperature used will generally be in the range 60 to 115° C., e.g. 70 to 110° C., the reactor pressure will generally be in the range 10 to 25 bar, and the residence time will generally be 0.5 to 8 hours, e.g. 0.5 to 4 hours. The gas used will be the monomer optionally as mixture with a non-reactive gas such as nitrogen or propane.

In addition to actual polymerisation steps and reactors, the process can contain any additional polymerisation steps, like prepolymerisation step, and any further after reactor handling steps as known in the art.

Preferably the multimodal propylene random copolymer (A) is produced in a sequential polymerization process comprising at least two polymerization zones operating at different conditions to produce the multimodal propylene random copolymer (A). The polymerization zones may operate in slurry, solution, or gas phase conditions or their combinations. Suitable processes are disclosed, among others, in WO-A-98/58975, WO-A-98/58976, EP-A-887380 and WO-A-98/58977.

In a preferred embodiment, the optional prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor.

The prepolymerization reaction is typically conducted at a temperature of 0 to 60° C., preferably from 10 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB 1580635.

The polymerization in the first polymerization zone may be conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

Slurry polymerization is preferably a so called bulk polymerization. By "bulk polymerization" is meant a process where the polymerization is conducted in a liquid monomer essentially in the absence of an inert diluent.

The temperature in the slurry polymerization is typically from 50 to 110° C., preferably from 60 to 100° C. and in particular from 60 to 80° C. The pressure is from 1 to 150 bar, preferably from 10 to 100 bar, most preferably from 30 to 65 bar. In some cases it may be preferred to conduct the polymerization at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The polymerization in gas phase may be conducted in a fluidized bed reactor, in a fast fluidized bed reactor or in a settled bed reactor or in any combination of these. When a combination of reactors is used then the polymer is transferred from one polymerization reactor to another. Furthermore, a part or whole of the polymer from a polymerization stage may be returned into a prior polymerization stage.

Typically the fluidized bed polymerization reactor is operated at a temperature within the range of from 50 to 100° C., preferably from 70 to 90° C. The pressure is suitably from 10 to 40 bar, preferably from 10 to 30 bar.

The adjustment of the melt flow rate during the polymerisation process of multimodal propylene random copolymer (A) is carried out in a conventional manner by using e.g. a chain termination agent (known also e.g. as molecular weight of MFR controlling agent), typically hydrogen.

The preferred multistage process is carried out in a reactor system comprising at least a loop reactor, and optionally one, two or more gas phase reactors, in said order. Said reactor system and process is known as Borstar® Technology. Especially preferred for the polymerization of the multimodal propylene random copolymer (A) is a reactor assembly consisting of a loop reactor followed by a gas phase reactor. The loop reactor is thereby optionally preceded by a prepolymerization reactor which may also be a slurry reactor.

Accordingly, in the polymerization stage of gas phase reactor preferably a copolymer mixture comprising the copolymer produced in loop reactor and a copolymer produced in the gas phase reactor is formed. The copolymer mixture is formed by introducing the particles of the copolymer of the loop reactor, containing active catalyst dispersed therein, together with additional propylene and comonomer, into the polymerization in gasphase reactor. This causes the copolymer produced in gas phase reactor to form on the particles containing the copolymer of the loop reactor.

Said first propylene random copolymer preferably reflects the propylene random copolymer having a high molecular weight (HMW) fraction of the propylene random copolymer (A) and said second propylene random copolymer preferably reflects the low molecular weight (LMW) fraction of the propylene random copolymer (A) as defined above. Thus, copolymer mixture comprising the first propylene random copolymer and a second propylene random copolymer preferably reflects a mixture of the high molecular weight (HMW) fraction and the low molecular weight (LMW) fraction of the propylene random copolymer (A) as defined above. The amount of any prepolymer fraction thereby preferably adds to the amount of the high molecular weight fraction.

As to catalyst, the multimodal propylene random copolymer (A) can be produced by polymerisation in the presence of any conventional coordination catalyst system including Ziegler-Natta, chromium and single site (like metallocene catalyst), preferably in the presence of a Ziegler-Natta catalyst system. Such Ziegler-Natta catalyst system typically comprises a solid catalyst component, preferably a solid transition metal component, and a cocatalyst, and optionally an external donor. The solid catalyst component comprises most preferably a magnesium halide, a titanium halide and an internal electron donor. Such catalysts are well known in the art.

It is preferred that the nucleating agent (B) is introduced to the multimodal propylene random copolymer (A) during the polymerisation process of the propylene random copolymer (A).

More preferably the nucleating agent (B) is introduced together with the solid Ziegler-Natta catalyst system for the polymerisation of the multimodal propylene random copolymer (A).

More preferably, a vinyl compound of the formula (I) as defined above or below, preferably vinyl cyclohexane (VCH), is polymerised in the presence of a catalyst system comprising the solid catalyst component, preferably a solid Ziegler Natta catalyst component, to obtain a modified catalyst system which is the reaction mixture comprising the solid catalyst component and the produced polymer of the vinyl compound of formula (I). In the obtained modified catalyst system the weight ratio (g) of the polymer of the vinyl compound of the formula (I), to the solid catalyst component is preferably up to 5 (5:1), preferably up to 3 (3:1) most preferably is from 0.5 (1:2) to 2 (2:1). The obtained modified catalyst system is then used for the polymerisation of the propylene random copolymer (A) of the invention.

General preparation of the modified catalyst system and the polypropylene nucleated with a vinyl compound (I) is disclosed e.g. in EP 1 028 984.

As to the solid Ziegler Natta catalyst component used for the modification, said catalyst component comprises preferably a transition metal component and a magnesium halide. These compounds may be supported on a particulate support, such as inorganic oxide, like silica or alumina, or, usually, the magnesium halide to form above said solid support. Examples of such solid catalyst components are disclosed, among others, in WO 87/07620, WO 92/21705, WO 93/11165, WO 93/11166, WO 93/19100, WO 97/36939, WO 98/12234, WO 99/33842.

The solid catalyst components for polymerising the multimodal propylene random copolymer (A) typically comprise, in addition to the magnesium halide and transition metal compound, an electron donor (internal electron donor).

Suitable electron donors are, among others, esters of carboxylic acids, like phthalates, citraconates, and succinates. Also oxygen- or nitrogen-containing silicon compounds may be used. Examples of suitable compounds are shown in WO 92/19659, WO 92/19653, WO 92/19658, U.S. Pat. Nos. 4,347,160, 4,382,019, 4,435,550, 4,465,782, 4,473,660, 4,530,912 and 4,560,671.

Moreover, said solid catalyst components are preferably used in combination with well known external electron donors, including without limiting to, ethers, ketones, amines, alcohols, phenols, phosphines and silanes, for example organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms; and well known cocatalysts, which preferably comprise an aluminium alkyl compound as known in the art, to polymerise the propylene random copolymer (A).

When the nucleating agent (B) is introduced to the multimodal propylene random copolymer (A) during the polymerisation process of the multimodal propylene random copolymer (A), the amount of nucleating agent (B) present in the multimodal propylene random copolymer (A) is preferably not more than 500 ppm, more preferably is 0.025 to 200 ppm, still more preferably is 1 to 100 ppm, and most preferably is 5 to 100 ppm, based on the multimodal propylene random copolymer (A) and the nucleating agent (B), preferably based on the total weight of the propylene composition (100 wt %).

Extrusion:

When the polymer has been removed from the last polymerisation stage, it is preferably subjected to process steps for removing the residual hydrocarbons from the polymer. Such processes are well known in the art and can include pressure reduction steps, purging steps, stripping steps, extraction steps and so on. Also combinations of different steps are possible. After the removal of residual hydrocarbons the second propylene copolymer composition is preferably mixed with additives as it is well known in the art. Such additives include antioxidants, process stabilizers, neutralisers, lubricating agents, nucleating agents, pigments and so on. The polymer particles are then extruded to pellets as it is known in the art. Preferably co-rotating twin screw extruder is used for the extrusion step. Such extruders are manufactured, for instance, by Coperion (Werner & Pfleiderer) and Japan Steel Works.

Article of the Invention:

Further, the present invention relates to an article comprising the multimodal polypropylene composition according to the present invention.

In a preferred embodiment, the article is selected from an extruded article, preferably a pipe application, or a moulded article, preferably an injection moulded or blow moulded article, application more preferably a fitting for pipe applications, comprising the multimodal polypropylene composition of the invention. The pipe and fitting produced from the polypropylene composition according to the invention preferably has good mechanical properties as described above and shown below in experimental part. Thus, the pipe according to the invention preferably qualifies as pressure pipe.

Pipe of the invention can be a monolayer pipe, wherein the pipe layer comprises, preferably consists of, the multimodal polypropylene composition of the invention, or a multilayer pipe, wherein at least one layer comprises, preferably consists of, the multimodal polypropylene composition of the invention.

The preferred pipe of the invention has at least one layer comprising, preferably consisting of, the multimodal polypropylene composition of the invention. Preferred pipe is a pressure pipe, more preferably a pressure pipe for hot and cold water applications.

Fitting of the invention preferably consists of the multimodal polypropylene composition of the invention.

Production of Pipe of the Invention:

Pipes can be produced from the multimodal polypropylene composition according to the present invention according to the methods known in the art. Thus, according to one preferred method the multimodal polypropylene composition is extruded through an annular die to a desired internal diameter, after which the multimodal polypropylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 metres or more.

Production of Fittings of the Invention:

Fittings of the invention can be produced from the multimodal polypropylene composition according to the present invention using the methods and equipment known in the art. Thus, according to one preferred method the multimodal polypropylene composition is moulded, preferably injection moulded or blown moulded, more preferably injection moulded, in a conventional manner using conventional moulding equipment, to a shape of a fitting for a pipe.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_{10}$ of polypropylene is measured at a temperature 230° C. and a load of 10 kg, the $MFR_2$ of polypropylene at a temperature 230° C. and a load of 2.16 kg. The quantity FRR (flow rate ratio) denotes the ratio of flow rates at different loads. Thus, $FRR_{10/2}$ denotes the ratio of $MFR_{10}/MFR_2$.

The melt index $MFR_2$ which is not accessible to direct measurement, such as the $MFR_2$ of the fraction of the second polymerization stage, is herein assumed to follow the following mixing rule:

$$MI_b = (w_1 \cdot MI_1^{-0.0965} + w_2 \cdot MI_2^{-0.0965})^{-\frac{1}{0.0965}}$$

Where w is the weight fraction of the component in the mixture, MI is the melt index $MFR_2$ and subscripts b, 1 and 2 refer to the mixture, component 1 and component 2, respectively.

b) Density

Density of the polymer was measured according to ISO 1183-1:2004 Method A on compression moulded specimen prepared according to EN ISO 1872-2 (February 2007) and is given in kg/m³.

c) Comonomer Content

The comonomer content was determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 micrometer and spectra recorded in transmission mode.

Specifically, the ethylene content of a polypropylene-co-ethylene copolymer is determined using the baseline corrected peak area of the quantitative bands found at 720-722 and 730-733 cm⁻¹. Specifically, the butene or hexene content of a polypropylene copolymer is determined using the baseline corrected peak area of the quantitative bands found at 1377-1379 cm⁻¹. Quantitative results are obtained based upon reference to the film thickness.

The comonomer content which is not accessible to direct measurement, such as the comonomer content of the fraction of the second polymerization stage, is herein assumed to follow the mixing rule:

$$C_b = w_1 \cdot C_1 + w_2 \cdot C_2$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad \text{(eq. 3)}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

d) Xylene Cold Solubles

Xylene cold solubles (XCS, wt.-%) content was determined at 25° C. according ISO 16152; first edition; 2005-07-01.

The content of xylene soluble polymer which is not accessible to direct measurement, such as the XCS of the fraction of the second polymerization stage, is herein assumed to follow the mixing rule:

$$XS_b = w_1 \cdot XS_1 + w_2 \cdot XS_2$$

Where XS is the content of xylene soluble polymer in weight-%, w is the weight fraction of the component in the mixture and subscripts b, 1 and 2 refer to the overall mixture, component 1 and component 2, respectively.

e) Flexural Modulus

The flexural modulus was determined according to ISO 178. The test specimens having a dimension of 80×10×4.0 mm³ (length×width×thickness) were prepared by injection molding according to EN ISO 1873-2. The length of the span between the supports was 64 mm, the test speed was 2 mm/min and the force was 100 N.

f) Tensile Stress at Yield, Tensile Strain at Yield

Tensile stress at yield and tensile strain at yield was determined according to ISO 527-1:1996 and ISO 527-2:1996 on test specimen ISO 527-2:1996 type 1A molded specimen, the Injection moulding carried out according to ISO 1873-2:2007.

g) Charpy Notched Impact Strength

Charpy notched impact strength (Charpy NIS) was determined according to ISO 179-1:2000 on notched specimen of 80×10×4 mm, cut from test specimen ISO 527-2:1996 type 1A. Notched impact specimen according to ISO 179-1/1eA:2000 was used. Testing temperature is 23±2° C. Injection moulding was carried out according to ISO 1873-2:2007.

h) Crystallization Temperature

The crystallization temperature $T_c$ was measured with a Mettler TA820 differential scanning calorimetry device (DSC) on 3±0.5 mg samples according to ISO 11357-3:1999. Crystallization temperature was obtained during 10° C./min cooling and heating scans between 30° C. and 225° C. The crystallization temperatures were taken as the peaks of the exotherms of said peaks.

i) Rheological Parameters, Polydispersity Index

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at T 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where
$\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0}\cos\delta \; [Pa] \quad (3)$$

$$G' = \frac{\sigma_0}{\gamma_0}\sin\delta \; [Pa] \quad (4)$$

$$G^* = G' + iG'' \; [Pa] \quad (5)$$

$$\eta^* = \eta' - i\eta'' \; [Pa \cdot s] \quad (6)$$

$$\eta' = \frac{G''}{\omega} \; [Pa \cdot s] \quad (7)$$

$$\eta'' = \frac{G'}{\omega} \; [Pa \cdot s] \quad (8)$$

The values of storage modulus (G'), loss modulus (G"), complex modulus (G*) and complex viscosity (η*) were obtained as a function of frequency (ω). Thereby, e.g. $\eta^*_{0.05\,rad/s}$ (eta*$_{0.05\,rad/s}$) is used as abbreviation for the complex viscosity at the frequency of 0.05 rad/s.

The polydispersity index, PI, is defined by equation 9.

$$PI = \frac{10^5}{G^1(\omega_{COP})}, \omega_{COP} = \omega \, far(G' = G'') \quad (9)$$

where, $\omega_{COP}$ is the cross-over angular frequency, determined as the angular frequency for which the storage modulus, G' equals the loss modulus, G".

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995).

[3] Definition of terms relating to the non-ultimate mechanical properties of polymers, Pure & Appl. Chem., Vol. 70, No. 3, pp. 701-754, 1998.

2. Examples a) Preparation of the Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491 566, EP 591 224 and EP 586 390.

For the preparation of Examples Ex1, Ex2 and Ex3 triethylaluminium (TEAL), dicyclopentyldimethoxysilane (DCPDMS) as donor (Do), catalyst as produced above and vinylcyclohexane (VCH) were added into oil, like mineral oil, e.g. Technol 68 (kinematic viscosity at 40° C. 62-74 cSt), in amounts so that Al/Ti was 3-4 mol/mol, Al/Do was as well 3-4 mol/mol, and weight ratio of VCH/solid catalyst was 1:1. The mixture was heated to 60-65° C. and allowed to react until the content of the unreacted vinylcyclohexane in the reaction mixture was less than 1000 ppm. Catalyst concentration in the final oil-catalyst slurry was 10-20 wt-%.

For the preparation of Reference Example Ref4 the preparation of the oil-catalyst slurry was conducted as described above for Examples Ex1, Ex2 and Ex3 with the exception that no vinylcyclohexane (VCH) was added into oil and no polymerisation step of VCH at 60-65° C. was performed.

b) Polymerization of Examples Ex1-3 and Reference Example Ref4

For the polymerization of Examples Ex1-3 that the catalyst including polymerized VCH was fed together with propylene to a prepolymerization reactor. Triethylaluminium was used as a cocatalyst and dicyclopentyldimethoxysilane as a donor. The polymerization conditions and feeds are listed in Table 1.

The slurry from the prepolymerization stage was directly fed to a loop reactor. Propylene, hydrogen and ethylene were further added to the loop reactor. The polymerization conditions and feeds are listed in Table 1.

The slurry from loop reactor was introduced to a gas phase reactor via direct feed line, i.e. without monomer flashing in-between the reactors. Propylene, ethylene and hydrogen were fed to the gas phase reactor. The polymerization conditions and feeds are listed in Table 1.

The final Poly-VCH content in the obtained final polymers of Examples Ex.1-3 was 200 ppm or less.

For the preparation of Reference Example Ref4 the same reactor assembly was used as for Examples Ex1-3 with the exception that the catalyst without polymerized VCH was used as polymerization catalyst. The polymerization conditions and feeds in the different polymerization stages are listed in Table 1.

a) Compounding and Pipe Extrusion

The polypropylene resins of Examples Ex1-3 and Reference Example Ref4 emerging from the gas phase reactor (identified as reactor powder in Table 1) were compounded together with conventional antioxidants and Ca-stearate (same amounts were used for Examples Ex1-3 and Ref.4) and pelletized in a W&P ZSK 70 twin-screw extruder (Coperion) at a melt temperature of 240° C. and an extruder throughput of 200 kg/h.

The polymer pellets of Examples Ex1-3 and Reference Example Ref4 were prepared to test specimens for the mechanical and thermal tests as listed below in Table 3 or were extruded to pipes in order to test the processability of the compositions.

TABLE 1

Polymerization conditions of Examples Ex1-3 and Reference Example Ref4

|  | Ex1 | Ex2 | Ex3 | Ref4 |
|---|---|---|---|---|
| Prepolymerisation step |  |  |  |  |
| Catalyst type | pVCH modified catalyst | pVCH modified catalyst | pVCH modified catalyst | as in Ex. 1-3, no pVCH modification |
| Cocatalyst (TEAL) feed [g/t C3] | 200 | 200 | 200 | 200 |
| Donor (DCPDMS) feed [g/t C3] | 40 | 20 | 20 | 40 |
| C2 feed [g/hour] | 400 | 400 | 400 | 400 |
| Temperature [° C.] | 30 | 30 | 30 | 30 |
| Pressure [kPa] | 5300 | 5300 | 5300 | 5300 |
| Loop Reactor |  |  |  |  |
| Temperature [° C.] | 70 | 70 | 68 | 70 |
| Pressure [kPa] | 5300 | 5300 | 5300 | 5300 |
| $H_2$/C3 [mol/kmol] | 0.07 | 0.06 | 0.07 | 0.05 |
| C2 content [wt-% (mol-%)] | 4.3 (6.3) | 4.3 (6.3) | 4.9 (7.2) | 4.3 (6.3) |
| $MFR_{10}$ [g/10 min] | 0.80 | 0.66 | 0.74 | 0.63 |
| XCS [wt %] | 9.7 | 10 | 11 | 7.7 |
| Split [%] | 55 | 55 | 55 | 55 |
| Phase Reactor |  |  |  |  |
| Temperature [° C.] | 85 | 85 | 85 | 85 |
| Pressure [kPa] | 1600 | 1600 | 1600 | 1600 |
| $H_2$/C3 [mol/kmol] | 39 | 58 | 55 | 115 |
| C2 content (calc.) [wt-% (mol-%)]* | 3.8 (5.6) | 4.0 (5.9) | 4.2 (6.2) | 4.0 (5.9) |
| XCS [wt %] (calc.)* | 6.5 | 6.8 | 7.4 | 5.8 |
| Split | 45 | 45 | 45 | 45 |
| Final polypropylene composition** |  |  |  |  |
| C2 content [wt-% (mol-%)] (measured) | 3.7 (5.4) | 4.1 (6.0) | 4.1 (6.0) | 4.2 (6.2) |
| $MFR_2$ [g/10 min] | 0.25 | 0.30 | 0.28 | 0.22 |
| XCS [wt %] (measured) | 5.7 | 6.8 | 8.3 | 4.2 |

C2 content refers to the ethylene comonomer content;
C3 refer to the propylene monomer feed.
*calculated for the polymer polymerised in the gpr reactor (high molecular weight fraction
**measured from final polypropylene composition after the compounding step (a) as described above b) Pipe Tests For pipe extrusion the polymer pellets of Examples Ex1-3 and Reference Example Ref4 were fed into a Battenfeld pipe extruder. The pipe extrusion conditions and processing properties are listed below in Table 2.

c) Cycle Time Measurement

Fittings of 110 mm diameter were prepared from the polymer composition of Examples Ex1 and Ex2 and Reference Examples Ref1, Ref2 and Ref3 using the same injection moulding device and processing set up/conditions. The cycle time for producing fittings of Examples Ex1 and Ex2 was reduced 20% compared to cycle time for producing fittings of Ref1, Ref2 and Ref3.

TABLE 2

Pipe extrusion conditions and processing properties of Examples Ex1-3 and Reference Example Ref4

|  | Ex1 | Ex2 | Ex3 | Ref4 |
|---|---|---|---|---|
| Extrusion Conditions |  |  |  |  |
| Torque [%] | 45 | 38 | 40 | 40 |
| Screw speed [rpm] | 43.0 | 47.1 | 46.8 | 46.6 |
| Extruder output [kg/h] | 33 | 33 | 33 | 33 |
| Pipe weight [g/m] | 270 | 270 | 273 | 273 |
| Extruder speed [m/min] | 2 | 2 | 2 | 2 |
| Vacuum pressure [bar] | 0.38 | 0.38 | 0.38 | 0.38 |
| Processing |  |  |  |  |
| Pipe diameter [mm] | 32.3 | 32.3 | 32.3 | 32.3 |
| Pipe wall thickness [mm] | 3 | 3 | 3 | 3 |
| Pipe shrinkage [%] | 3.3 | 3.3 | 3.15 | 3.0 |
| Surface appearance | ++ | ++ | ++ | + |

++ means very good in visual inspection
+ means good in visual inspection

Cycle Time Measurement

Fittings of 110 mm diameter were prepared from the polymer composition of Examples Ex1-3 and Ref.4 using the same injection moulding device and processing set up/conditions. The cycle time for producing fittings of Examples Ex.1-3 was reduced 20% compared to cycle time for producing fittings of Ref4.

TABLE 3

Mechanical and thermal properties of Examples Ex1-3 and Reference Example Ref4

|  | Ex1 | Ex2 | Ex3 | Ref4 |
|---|---|---|---|---|
| $MFR_2$ (pellets) [g/10 min] | 0.23 | 0.23 | 0.27 | 0.29 |
| PI | 4.1 | 3.5 | 3.3 | n.d. |
| Flexural modulus [MPa] | 1078 | 987 | 968 | 964 |
| Charpy NIS, 23° C. [kJ/m$^2$] | 41.1 | 40.4 | 39.4 | 24.3 |
| Ten. Stress (yield) [MPa] | 30.8 | 28.8 | 28.5 | 28.8 |
| Ten. Strain (yield) [%] | 12.8 | 12.8 | 12.9 | 12.7 |
| Tc [° C.] | 114.8 | 113.9 | 115.0 | 100.5 | n.d. not determined

It can be seen from the results of Tables 2 and 3 that the Examples Ex1-3 according to the invention show an improved balance of properties in terms of flexural modulus, Charpy notched impact strength at room temperature, tensile stress at yield, tensile strain at yield, extruder output, surface appearance and pipe shrinkage.

The invention claimed is:

1. A polypropylene composition suitable for pipe applications comprising a multimodal propylene random copolymer (A) comprising at least one comonomer selected from alpha-olefins with 2 or 4 to 8 carbon atoms comprising at least a propylene random copolymer having a low molecular weight (low molecular weight (LMW) fraction) and a propylene random copolymer having a high molecular weight (high molecular weight (HMW) fraction), and a nucleating agent (B) that is other than a beta-nucleating agent, wherein the polypropylene composition has a Charpy Notched Impact Strength at 23° C. of at least 30 kJ/m², determined according to ISO 179/1eA:2000 using notched injection moulded specimens and a crystallization temperature $T_c$ of 105° C. to 120° C.

2. The polypropylene composition according to claim 1, wherein the multimodal propylene random copolymer (A) does not contain an elastomeric polymer phase dispersed therein.

3. The polypropylene composition according to claim 1, wherein the polypropylene composition has a flexural modulus of at least 700 MPa to an upper limit of not more than 1400 MPa, determined according to ISO 178 at a test speed of 2 mm/min and a force of 100N on test specimens having a dimension of 80×10×4.0 mm³ (length×width×thickness) prepared by injection moulding according to EN ISO 1873-2.

4. The polypropylene composition according to claim 1, wherein the polypropylene composition has a tensile stress at yield of at least 20 MPa, determined according to ISO 527-2:1996 using type 1A injection moulded test specimens prepared according to ISO 527-2:1996.

5. The polypropylene composition according to claim 1, wherein the polypropylene composition has a crystallization temperature Tc of 110° C. to 120° C.

6. The polypropylene composition according to claim 1, wherein the polypropylene composition has a melt flow rate MFR2 (2.16 kg, 230° C.) of 0.1 to 1.0 g/10 min, determined according to ISO 1133.

7. The polypropylene composition according to claim 1, wherein the polypropylene composition has a content of xylene cold solubles (XCS) of 1 to 15 wt %, determined at 25° C. according to ISO 16152.

8. The polypropylene composition according to claim 1, wherein the multimodal propylene random copolymer (A) is a multimodal propylene random copolymer with ethylene comonomer.

9. The polypropylene composition according to claim 1, wherein the comonomer content of the multimodal propylene random copolymer (A) is in the range of 0.1 to 14 mol %, based on the total molar content of the multimodal propylene random copolymer (A).

10. The polypropylene composition according to claim 1, wherein the low molecular weight fraction is present in the propylene random copolymer in an amount of 35 to 55 wt %, and the high molecular weight fraction is present in the propylene random copolymer in an amount of 65 to 45 wt %, based on the total amount of the propylene random copolymer (100 wt %).

11. The polypropylene composition according to claim 1 comprising from 0.1 to 10000 ppm by weight of the nucleating agent (B), wherein the nucleating agent (B) is a polymeric nucleating agent based on the total weight of the polypropylene composition (100 wt %).

12. The polypropylene composition according to claim 11, wherein the nucleating agent (B) is a polymer of at least one vinyl compound according to the following formula

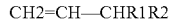  (I)

wherein R1 and R2 together form a 5- or 6-membered saturated, unsaturated or aromatic ring, or independently represent an alkyl group comprising 1 to 4 carbon atoms, preferably together form a 5 or 6 membered saturated, unsaturated or aromatic ring, optionally containing substituents, or are independently selected from C1 to C4-alkyl groups whereby in case R1 and R2 form an aromatic ring the hydrogen atom of the —CHR1R2 moiety is not present.

13. The polypropylene composition according to claim 11, wherein the nucleating agent (B) is a vinyl cyclohexane (VCH) polymer present in an amount from 0.025 to 200 ppm by weight, based on the total weight of the polypropylene composition (100 wt %).

14. A process for producing a polypropylene composition according to claim 11, wherein the propylene random copolymer is polymerized in a multistage polymerization process in the presence of
(I) a solid catalyst component comprising a magnesium halide, a titanium halide and an internal electron donor; and
(II) a cocatalyst comprising an aluminum alkyl and optionally an external electron donor, and
(III) an optional nucleating agent (B), preferably in the presence of a nucleating agent (B);
the multistage process comprising the steps of
(a) continuously polymerizing propylene together with a comonomer selected from alpha-olefins with 2 or 4 to 8 carbon atoms, in a first polymerization stage by introducing streams of propylene, hydrogen and said comonomer into the first polymerization stage at a temperature of 60 to 80° C. and a pressure of 3000 to 6500 kPa to produce a first propylene random copolymer, wherein said first propylene random copolymer has a melt flow rate MFR2 (2.16 kg; 230° C.; ISO 1133) of from 0.3 to 2.0 g/m in;
(b) withdrawing from the first polymerization stage a stream comprising said first propylene random copolymer and transferring said stream into a second polymerization stage;
(c) polymerizing propylene together with a comonomer selected from alpha-olefins with 2 or 4 to 8 carbon atoms, in said second polymerization stage by introducing streams of propylene, said comonomer and optionally hydrogen into said second polymerization stage at a temperature of 70 to 90° C. and a pressure of 1000 to 3000 kPa to produce a propylene random copolymer (A) of said first propylene random copolymer and a second propylene random copolymer;
(d) continuously withdrawing a stream comprising said propylene random copolymer (A) from the second polymerization stage and optionally mixing said propylene random copolymer (A) with additives; and
(e) extruding said propylene random copolymer mixture into pellets, which have a melt flow rate MFR2 (2.16 kg; 230° C.; ISO 1133) of from 0.05 to 1.0 g/min,
and wherein the first propylene random copolymer has preferably a higher weight average molecular weight than the second propylene random copolymer.

15. The process according to claim 14, wherein the multistage process comprises a further step (aa) preceding step (a), wherein (aa) polymerising a vinyl compound of the formula (I)

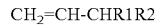  (I)

wherein R1 and R2 together form a 5- or 6-membered saturated, unsaturated or aromatic ring, or independently represent an alkyl group comprising 1 to 4 carbon atoms, preferably together form a 5 or 6 membered saturated, unsaturated or aromatic ring, optionally containing substituents, or are independently selected from Cl to C4-alkvl groups whereby in case R1 and R2 form an aromatic ring the hydrogen atom of the -CHR1R2 moiety is not present, preferably vinyl cyclohexane (VCH), in the presence of a catalyst system comprising the solid catalyst component (I) to obtain a modified catalyst system which is the reaction mixture comprising the solid catalyst component (I) and the produced polymer of the vinyl compound of formula (I), preferably, and wherein, the weight ratio (g) of the polymer of the vinyl compound of the formula (I), to the solid catalyst component (I) is up to 5 (5:1), preferably up to 3 (3:1) most preferably is from 0.5 (1:2) to 2 (2:1), and the obtained modified catalyst system is fed to polymerization step (a) of the multi-stage process for producing the multimodal propylene copolymer (A).

16. The polypropylene composition obtained the process according to claim 14.

17. An article comprising the polypropylene composition according to claim 1.

18. An article, comprising the polypropylene composition according to claim 3.

* * * * *